United States Patent
Schultz

(10) Patent No.: US 7,647,647 B2
(45) Date of Patent: Jan. 12, 2010

(54) SYSTEM, METHOD AND PROGRAM PRODUCT FOR TEMPORALLY AUTHORIZING PROGRAM EXECUTION

(75) Inventor: Dale M. Schultz, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 10/912,354

(22) Filed: Aug. 5, 2004

(65) Prior Publication Data

US 2006/0031943 A1 Feb. 9, 2006

(51) Int. Cl.
H04N 7/16 (2006.01)

(52) U.S. Cl. ............... 726/29; 726/30; 726/3; 726/27; 726/35; 713/164; 713/100; 713/172; 713/184

(58) Field of Classification Search ............ 726/29, 726/30, 35, 3; 713/100, 164, 172, 184
See application file for complete search history.

(56) References Cited

U.S. PATENT DOCUMENTS

| | | | | |
|---|---|---|---|---|
| 5,566,336 | A * | 10/1996 | Futatsugi et al. | 717/109 |
| 5,898,778 | A * | 4/1999 | Antonini | 705/56 |
| 5,920,850 | A * | 7/1999 | Hunter et al. | 705/405 |
| 6,008,737 | A * | 12/1999 | Deluca et al. | 340/5.74 |
| 6,272,636 | B1 * | 8/2001 | Neville et al. | 713/189 |
| 6,290,403 | B1 * | 9/2001 | Onishi et al. | 712/200 |
| 6,304,969 | B1 * | 10/2001 | Wasserman et al. | 713/172 |
| 6,453,424 | B1 | 9/2002 | Janniello | |
| 6,604,197 | B1 | 8/2003 | Lau et al. | |
| 6,618,810 | B1 * | 9/2003 | Dirie | 726/27 |
| 6,643,781 | B1 * | 11/2003 | Merriam | 726/35 |
| 7,085,928 | B1 * | 8/2006 | Schmid et al. | 713/164 |
| 7,219,222 | B1 * | 5/2007 | Durbin et al. | 713/100 |
| 7,231,199 | B2 * | 6/2007 | Adams et al. | 455/403 |
| 7,249,262 | B2 * | 7/2007 | Hauck et al. | 713/184 |
| 7,263,716 | B1 * | 8/2007 | Gulick | 726/3 |
| 7,290,047 | B2 * | 10/2007 | Yamamoto et al. | 709/223 |
| 7,320,143 | B2 * | 1/2008 | Le Pennec et al. | 726/30 |
| 2001/0005890 | A1 * | 6/2001 | Nitaki | 713/202 |
| 2002/0144124 | A1 | 10/2002 | Remer et al. | |
| 2002/0162016 | A1 * | 10/2002 | Colvin | 713/200 |
| 2002/0194470 | A1 * | 12/2002 | Grupe | 713/153 |
| 2003/0014659 | A1 * | 1/2003 | Zhu | 713/200 |
| 2003/0149714 | A1 * | 8/2003 | Casati et al. | 709/100 |
| 2003/0221120 | A1 | 11/2003 | Colvig et al. | |
| 2004/0044895 | A1 * | 3/2004 | Reasons et al. | 713/182 |
| 2004/0117784 | A1 * | 6/2004 | Endoh | 717/169 |
| 2006/0117314 | A1 * | 6/2006 | Sato | 717/174 |

OTHER PUBLICATIONS

"Understanding Lotus Notes Security and Execution Control List (ECL) Setting.", Kurt E. Sanders, May 15th, 2002.*
Kurt E. Sanders, May 15, 2002, "Understanding Lotus Notes Security and Execution Control List (ECL) Setting".*

* cited by examiner

*Primary Examiner*—Michael J Simitoski
*Assistant Examiner*—Yonas Bayou
(74) *Attorney, Agent, or Firm*—Daniel McLoughlin Hoffman Warnick LLC

(57) ABSTRACT

A system, method and program product that allows a set of actions being executed on a computer system to be temporally authorized for execution for a short duration. A computer system is provided comprising: an execution platform for executing program code; and an execution control system that can interrupt execution of actions encountered in the program code, wherein the execution control system includes a system for temporally authorizing execution of an encountered action.

6 Claims, 2 Drawing Sheets

SYSTEM, METHOD AND PROGRAM PRODUCT FOR TEMPORALLY AUTHORIZING PROGRAM EXECUTION

BACKGROUND OF THE INVENTION

1. Technical Field

The present invention relates generally to controlling execution of actions on a computer system, and more specifically relates to allowing temporal authorization of an executable action on a computer system.

2. Related Art

With the advent of distributed networks, such as the Internet, it has become common practice to allow executable programs to be automatically loaded and executed on networked computer systems. Often such programs are loaded by other programs, such a browser, with little oversight by the user. While such programs may be often be for legitimate purposes, e.g., to update a user's calendar with a new appointment, some actions may be unwanted, e.g., the program may cause unwanted advertisements to be displayed, or worse, execute malicious code such as a virus.

In order to address this problem, many execution platforms, such as LOTUS NOTES™, include an execution control system that allows a user to control what code can be executed on the user's computer based on who signed the code. In particular, an execution control list (ECL) is provided that details which signers/programs are allowed. When code tries to execute something that has not been allowed, an alert dialogue window pops up to notify the user of the problem. Current technology allows the user to address the problem by: (1) not allowing execution; (2) allowing the action to execute this one time; or (3) adding the signer to the ECL so that the signer always has permission to execute the action.

The second option, "allowing the action to execute this one time," is meant to handle the case in which the user does not want to trust the signer forever for a particular operation, but wants to allow execution this one time. Unfortunately, some operations may occur in a code loop, and thus require permission for each iteration. In these cases, the alert dialogue window may pop up repeatedly, requiring the user to repeatedly select the second option. When these situations occur, it is not unusual for the user to just select option three, thus allowing the program to perform the operation at any time. This has the undesirable effect of reducing security on the user's workstation, as the program may be executed at any time in the future without alerting the user. The only current method for addressing the problem, without manually allowing each iteration to execute, is to manually edit the ECL to remove the added signer from the list of signers allowed to perform the operation, after the actions of the program have been executed. The removal of the permission afterwards is usually forgotten about.

Accordingly, a need exists for a system that addresses the problem of granting execution privileges to an action embedded in a program code loop.

SUMMARY OF THE INVENTION

The present invention addresses the above-mentioned problems, as well as others, by providing an execution control system, method and program product, which allows temporal authorization of an executable action on a computer system. In particular, an end user is provided with the ability to authorize execution of an operation for a short duration of time (e.g., five seconds), thus allowing actions embedded in a program loop to execute without repeatedly causing an alert.

In a first aspect, the invention provides a computer system, comprising: an execution platform for executing program code; and an execution control system that can interrupt execution of actions encountered in the program code, wherein the execution control system includes a system for temporally authorizing execution of an encountered action for a time duration.

In a second aspect, the invention provides a program product stored on a recordable medium for controlling execution of actions being executed from within a computer program, comprising: means for interrupting execution and for displaying an alert to a user when an action is encountered in the computer program; and means for allowing the user to temporally allow execution of the encountered action for a predetermined time duration.

In a third aspect, the invention provides a method for controlling execution of actions being executed from within a computer program, comprising: interrupting execution of the computer program when an action is encountered; checking to see if the encountered action is on an execution control list; displaying an alert if the encountered action is not allowed by the execution control list, wherein the alert includes an option for allowing the user to temporally authorize execution for a time duration; authorizing execution of the encountered action if the user selects the option for allowing temporal authorization; and disabling the authorization after the time duration.

In a fourth aspect, the invention provides a system for deploying an application for controlling execution of actions being executed by a program on a computer system, comprising: a computer infrastructure being operable to: generate an alert when an action is encountered during the execution of the program; and allow an end user to select an option that temporally authorizes execution of the encountered actions for a predetermined time duration.

In a fifth aspect, the invention provides computer software embodied in a propagated signal for controlling execution of actions being executed on a computer system, the computer software comprising instructions to cause a computer to perform the following functions: generate an alert when an action is encountered during the execution of the program; and allow an end user to select an option that temporally authorizes execution of the encountered action for a predetermined time duration.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

Figure 1:
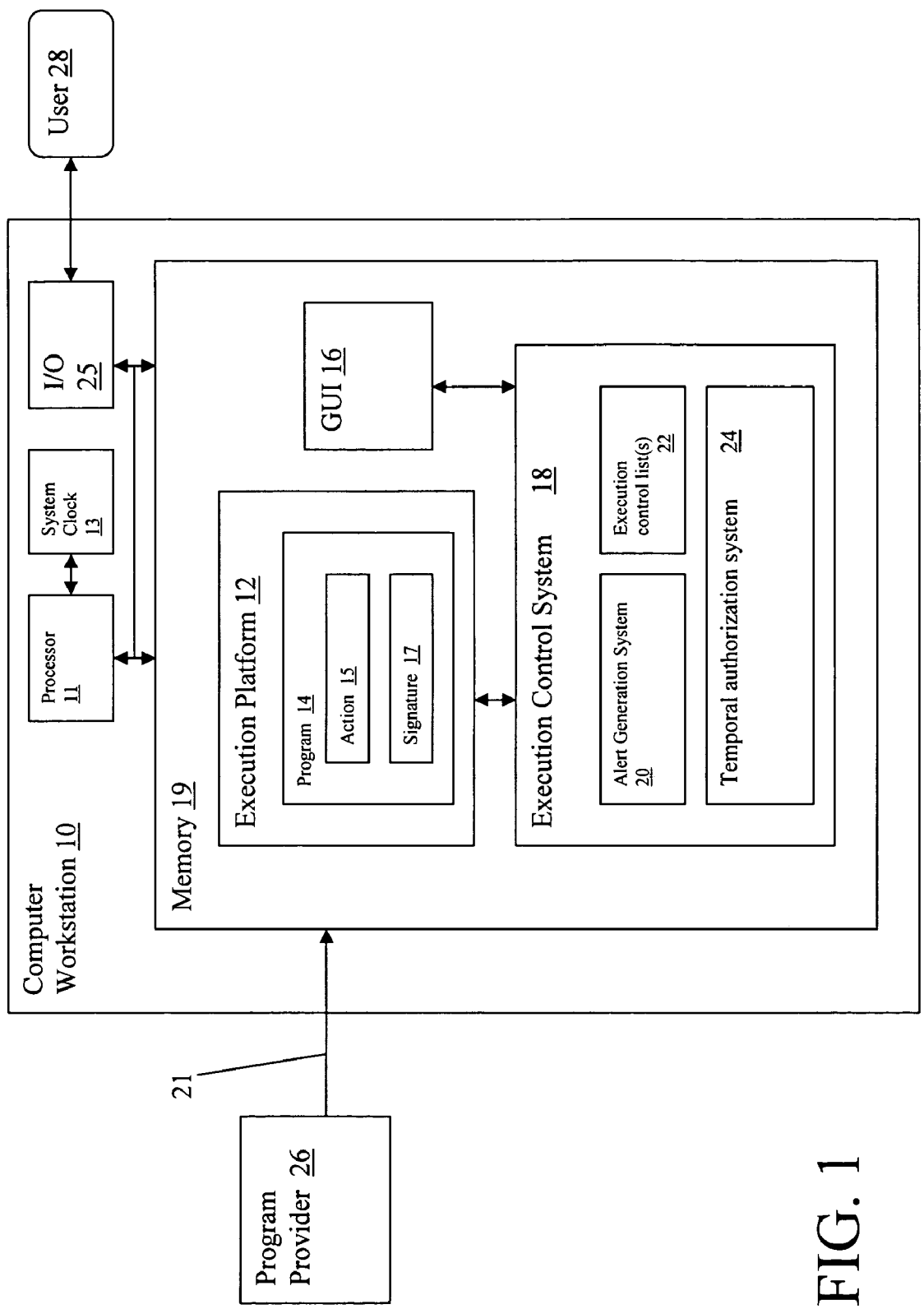
FIG. 1 shows a workstation having an execution control system with temporal authorization in accordance with the present invention.

Referring now to the drawings, FIG. 1 depicts a computer workstation 10 having an execution control system 18 that allows temporal authorization of an action 15 being executed by a program 14 within an execution platform 12 in the computer workstation 10. Execution platform 12 may comprise any platform, e.g., an operating system, a client program, etc., capable of executing/running program 14. Program 14 may comprise any type of program code and may originate from any source. In the illustrative embodiment shown in FIG. 1, program 14 is loaded into execution platform 12 from a program provider 26 via a communication channel 21. Program provider 26 may, for example, comprise a service provider, a web site, a server, another workstation in a network, a database, a memory source, etc.

Figure 2:
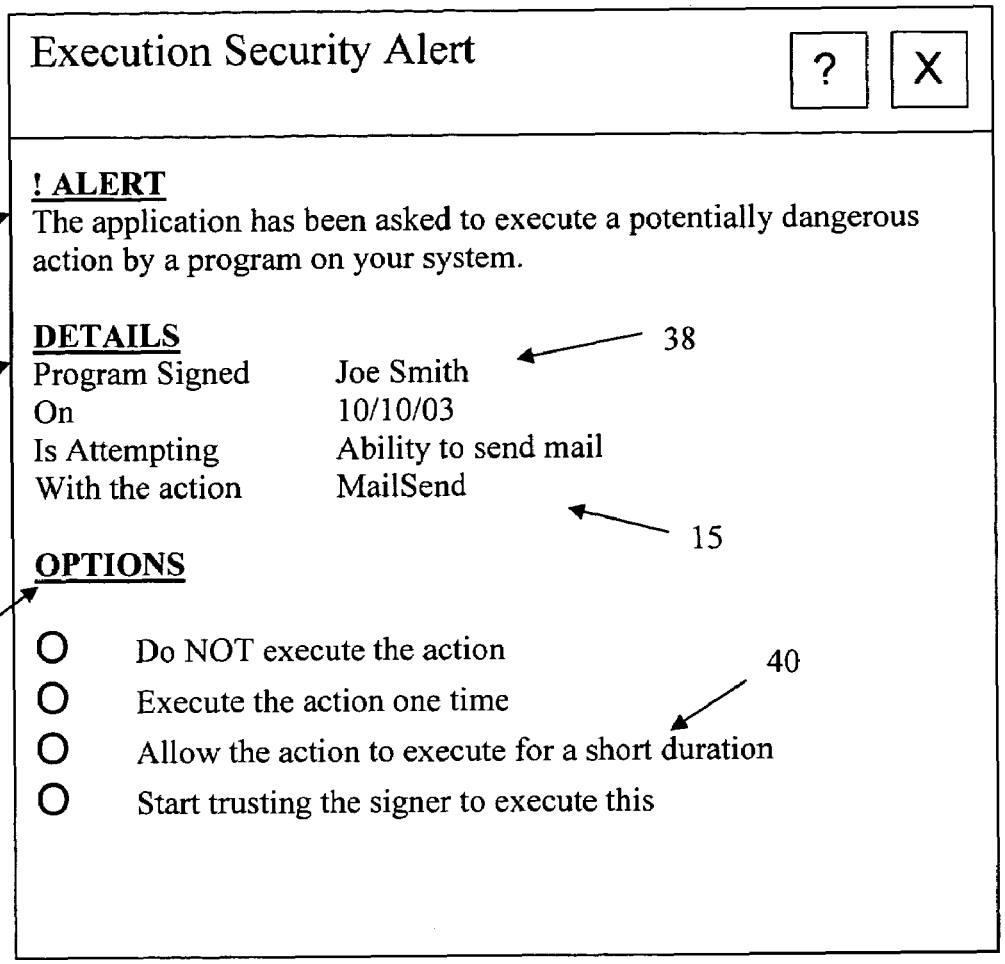
FIG. 2 shows an alert dialog window that includes a temporal authorization according to one embodiment of the invention.

Program 14 includes a digital signature 17 from a signer of the program (e.g., program provider 26) and at least one type of action 15 that is subject to control by the execution control system 18. Action 15 may comprise any type of operation that can be executed on computer workstation 10, such as sending email, modifying files, etc. When the program 14 attempts to execute the action 15, alert generation system 20 within execution control system 18 generates an alert via graphical user interface (GUI) 16 to user 28. The alert may, e.g., comprise a pop up dialog window that appears at a user's display. An example of such an alert window 30 is shown in FIG. 2, and is described in further detail below.

Execution control system 18 includes an execution control list(s) (ECL) 22 that lists actions and signers of programs that are allowed to execute those actions. For instance, a simple ECL 22 may include the following:

| Action | Program Signer |
| --- | --- |
| MailSend | Bob Parker |
| CalandarUpdate | Pete Jones |

Thus, if a program signed by Bob Parker attempts to execute a MailSend action, no alert will be issued. If however, an action, such as MailSend was attempted by a program signer that was not on the list, then an alert would be generated, such as the alert window 30 shown in FIG. 2.

As shown in FIG. 2, alert window 30 includes: (1) an alert message 32 indicating that program 14 wants to execute action 15; (2) details 34 of the program 14 including the signer 38 of the program and action 15; and (3) a set of options 36 given to the user. The first, second and fourth options comprise standard options, including "Do NOT execute the action," "execute the action one time," and "Start trusting the signer to execute this," respectively. Option one will cause the action to be skipped, option two will allow the action to be executed without adding the signer to the ECL 22 and option four will cause the signer to be added to the ECL 22.

The third option, "Allow the action to execute for a short duration," (40) causes the temporal authorization system 24 to temporarily authorize the action 15 for a predetermined time duration. For instance, selecting this option may allow the action to execute for the next five seconds. Thereafter, an attempt to execute the action again will result in the alert window 30 reappearing. Thus, programs having repetitive actions subject to execution control can be carried out without re-displaying alert window 30. It should be understood that the duration utilized by temporal authorization system 24 is not limited to any specific time value, e.g., it may be in the range of one to 10 seconds, or longer if desired. Moreover, alert window 30 could be configured to allow the end user to select the time duration.

Temporal authorization system 24 can be implemented in any manner. For example, temporal authorization system 24 may cause the signer to be added to the ECL 22 for a specified duration, and then automatically removed after the duration. Alternatively, an expiration date/time may be added to entries in the ECL 22 as follows, which can be checked against the system clock 13.

| Action | Program Signer | Expiration |
| --- | --- | --- |
| MailSend | Bob Parker | 2005-05-18-12:36:18 |
| CalandarUpdate | Pete Jones | 2005-05-18-12:36:22 |

Execution of actions would only be allowed if the expiration date/time was not exceeded. Permanent entries, i.e., those actions that are always allowed, may simply be listed without an expiration date/time.

In order to address the possibility that security may be circumvented by altering the system clock 13, a second "temporary" ECL may be maintained with both an expiration date/time and a date/time stamp of when the entry was created. An example of a temporary ECL is as follows:

| Action | Program Signer | Expiration | Time Stamp |
| --- | --- | --- | --- |
| MailSend | Bob Parker | 2005-05-18-12:36:18 | 2005-05-18-12:36:13 |
| CalandarUpdate | Pete Jones | 2005-05-18-12:36:22 | 2005-05-18-12:36:17 |

If the system clock 13 precedes the time stamp, then it can be concluded that the system clock has been tampered with. In operation, execution requests can be directed first to the temporary ECL, and then to the primary ECL if the request was not allowed by the temporary ECL. Obviously, other implementations could be utilized without departing from the scope of the invention. For instance, while the invention has been described with reference to utilizing an ECL that lists actions which are allowed to execute without interruption, the ECL could be implemented as a list of actions that are not allowed to execute without interruption.

Referring again to FIG. 1, Computer workstation 10 may comprise any type of computing device, including a server, a desktop computer, a laptop, a handheld device, a mobile phone, a pager, a personal data assistant, etc. Computer workstation 10 is shown including a processor 11, a system clock 13, a memory 19, and an input/output (I/O) interface 25. Although not shown, workstation 10 may include a bus, external I/O devices/resources, a storage system, etc. In general, processor 11 executes computer program code such as execution control system 18, execution platform 12 and GUI 16, which are stored in memory 19.

It is understood that computer workstation 10 is only illustrative of various possible combinations of hardware and software. For example, processor 11 may comprise a single processing unit, or be distributed across one or more processing units in one or more locations, e.g., on a client and server. Similarly, memory 19 can comprise any combination of various types of data storage and/or transmission media that reside at one or more physical locations. I/O interface 25 can comprise any system for exchanging information with one or more users and/or other computing devices. Connectivity with program provider 26 and/or users 28 may occur over a network 21 that utilizes conventional network connectivity, such as Token Ring, Ethernet, WiFi or other conventional communications standards. Further, network 21 can comprise any combination of various types of networks, including the Internet, a wide area network (WAN), a local area network (LAN), a virtual private network (VPN), etc.

It should also be appreciated that the teachings of the present invention could be offered as a business method on a subscription or fee basis. For example, execution control system 18 could be created, maintained, supported, and/or deployed by a service provider that offers the functions described herein for customers. It is understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

The present invention also can be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

The invention claimed is:

1. A computer system, comprising:
at least one computing device including:
an execution platform for executing program code; and
an execution control system that can interrupt execution of actions encountered in the program code, wherein the program code includes a digital signature from a signer of the program code, wherein the execution control system includes a system for temporarily authorizing execution of an encountered action for a time duration and, wherein the execution control system includes an execution control list containing actions and signers of the program code that are allowed or not allowed to execute without interruption, wherein the execution control system includes an alert generation system that causes a dialogue window to be presented to an end user when a signer of the program code is not included in the execution control list for the encountered action and, wherein the dialogue window includes an alert message and a signer of the program and the action and a set of options for a user.

2. The computer system of claim 1, wherein the dialogue window includes an option for allowing the user to temporarily authorize execution of the encountered action for a predetermined time duration.

3. The computer system of claim 2, wherein the predetermined time duration is substantially in the range of zero to ten seconds.

4. The computer system of claim 1, wherein the system for temporally authorizing execution includes a system for temporarily adding the encountered action to the execution control list for the time duration.

5. The computer system of claim 1, wherein the system for temporarily authorizing execution includes a system for adding the encountered action to the execution control list along with an expiration date/time of the authorization.

6. The computer system of claim 5, wherein the system for temporarily authorizing execution additionally adds a time stamp to the execution control list.

* * * * *

UNITED STATES PATENT AND TRADEMARK OFFICE
CERTIFICATE OF CORRECTION

| | | |
|---|---|---|
| PATENT NO. | : 7,647,647 B2 | Page 1 of 1 |
| APPLICATION NO. | : 10/912354 | |
| DATED | : January 12, 2010 | |
| INVENTOR(S) | : Dale M. Schultz | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1160 days.

Signed and Sealed this

Sixteenth Day of November, 2010

David J. Kappos
*Director of the United States Patent and Trademark Office*